United States Patent
Bagepalli et al.

(10) Patent No.: US 7,841,835 B2
(45) Date of Patent: Nov. 30, 2010

(54) SPAR CAP FOR WIND TURBINE BLADES

(75) Inventors: Bharat S. Bagepalli, Niskayuna, NY (US); Carlos E. Latorre, Greer, SC (US); Mohamad B. Sultan, Simpsonville, SC (US); Jason J. Testa, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 92 days.

(21) Appl. No.: 12/389,699

(22) Filed: Feb. 20, 2009

(65) Prior Publication Data

US 2010/0135815 A1    Jun. 3, 2010

(51) Int. Cl.
*F03D 1/06* (2006.01)
*F03D 11/00* (2006.01)

(52) U.S. Cl. .............. 416/226; 416/230; 416/233; 416/241 A

(58) Field of Classification Search .............. 416/224, 416/226, 232, 233, 229 R, 230, 241 A; 244/123.1, 244/123.2, 123.7, 123.8, 123.13, 123.5, 123.6

See application file for complete search history.

(56) References Cited

U.S. PATENT DOCUMENTS

| 4,643,646 | A  | * | 2/1987  | Hahn et al. .................. 416/226 |
|-----------|----|---|---------|---------------------------------------|
| 6,374,570 | B1 | * | 4/2002  | McKague, Jr. ............... 52/762   |
| 7,153,090 | B2 |   | 12/2006 | DeLeonardo et al.                     |
| 7,205,066 | B1 | * | 4/2007  | Hammi et al. ............... 429/119  |
| 7,377,752 | B2 |   | 5/2008  | Mohamed                               |
| 2005/0186081 | A1 |   | 8/2005  | Mohamed                            |
| 2006/0225278 | A1 |   | 10/2006 | Lin et al.                         |
| 2007/0040294 | A1 |   | 2/2007  | Arelt                              |
| 2007/0128025 | A1 | * | 6/2007  | Driver .......................... 416/23 |
| 2007/0261787 | A1 | * | 11/2007 | Malis .......................... 156/285 |
| 2008/0181781 | A1 |   | 7/2008  | Livingston et al.                  |
| 2008/0219851 | A1 |   | 9/2008  | Althoff et al.                     |
| 2010/0143142 | A1 | * | 6/2010  | Akhtar ........................ 416/226 |

* cited by examiner

*Primary Examiner*—Christopher Verdier
(74) *Attorney, Agent, or Firm*—James W. Pemrick; Ernest G. Cusick; Frank A. Landgraff

(57) ABSTRACT

A blade of a wind turbine is provided having an improved spar cap. The spar cap includes at least one trench extending in a substantially span-wise direction in at least a portion of the spar cap. At least one shear web is connected to the spar cap. At least a portion of the shear web is positioned within the trench of the spar cap.

19 Claims, 4 Drawing Sheets

SPAR CAP FOR WIND TURBINE BLADES

BACKGROUND OF THE INVENTION

The subject matter described here generally relates to wind turbine blades, and, more particularly, to wind turbine blades having improved spar caps.

A wind turbine is a machine for converting the kinetic energy in wind into mechanical energy. If the mechanical energy is used directly by the machinery, such as to pump water or to grind wheat, then the wind turbine may be referred to as a windmill. Similarly, if the mechanical energy is converted to electricity, then the machine may also be referred to as a wind generator, wind turbine or wind power plant.

Wind turbines are typically categorized according to the vertical or horizontal axis about which the blades rotate. One so-called horizontal-axis wind generator is schematically illustrated in FIG. 1. This particular configuration for a wind turbine 2 includes a tower 4 supporting a nacelle 6 enclosing a drive train 8. The blades 10 are arranged on a hub to form a "rotor" at one end of the drive train 8 outside of the nacelle 6. The rotating blades 10 drive a gearbox 12 connected to an electrical generator 14 at the other end of the drive train 8 arranged inside the nacelle 6 along with a control system 16 that receives input from an anemometer 18.

The blades 10 generate lift and capture momentum from moving air that is then imparted to a rotor as the blades spin in the "rotor plane." Each blade is typically secured at its "root" end, and then "spans" radially "outboard" to a free, "tip" end. The distance from the tip to the root, at the opposite end of the blade, is called the "span." The front, or "leading edge," of the blade connects the forward-most points of the blade that first contact the air. The rear, or "trailing edge," of the blade is where airflow that has been separated by the leading edge rejoins after passing over the suction and pressure surfaces of the blade.

A "chord line" connects the leading and trailing edges of the blade in the direction of the typical airflow across the blade. The length of the chord line is simply called "the chord." Since many blades 10 change their chord over the span, the chord length is referred to as the "root chord," near the root, and the "tip chord," near the tip of the blade. The chord lines are arranged in the "chord planes" that extend through the streamlines on the corresponding pressure and suction surfaces of the blade. Multiple "shear web planes" are arranged perpendicular to the chord plane.

As illustrated in FIG. 2, the blades 10 for such wind turbines 2 are typically fabricated by building up two or more skin or "shell" portions 20 from layers of woven fabric and resin. Spar caps 22 are placed in the shell portions 20 and are combined with shear webs 24 to form a structural support member. The shear webs 24 and spar caps 22 extend at least partially spanwise along the inside of the blade 10 and are typically configured as I-shaped members. For example, the spar caps 22 may be joined to the inside of the suction and pressure surfaces of the shell 20 or they may form part of the shell. In some blades, an additional trailing edge shear web 26 may also be incorporated into the blade.

The top and bottom spar caps 22 together with the shear web 24 form the main fore-aft structural member of the wind turbine blade 10. FIG. 3 illustrates a partial view of one known spar cap and shear web. The spar cap 22 can be made from an assemblage of layers of unidirectional (UD) glass fiber tapes. Thinner root and tip sections have fewer layers of the UD glass fiber tapes. The cross-sections at any section along the length of the spar cap is are typically rectangular. Some known manufacturing methods use foam wedges 32 to bridge the gap at sections where the skin foam 34 thickness is less than the spar cap thickness. This is needed to avoid abrupt changes in the surface of the subsequent layers of glass fiber and resin. If the wedges 32 were not used, then a wrinkle or crack could appear in the subsequently applied layers. Typically, the shear web 24 is joined to the spar caps 22 using a bonding material 36, such as an adhesive. The fabrication of each of these constituent parts is in itself an involved and labor-intensive process comprised of laying out fabric, glass fibers, and foam, followed by or with intervening resin application steps. In addition, the thickness of the shear web 24, in the span-wise direction, should be thick enough to provide enough surface area to securely bond with adhesive 36. As a result, the shear web 24 is often much thicker, and heavier, than needed for structural purposes. This is a disadvantage from a weight perspective.

BRIEF DESCRIPTION OF THE INVENTION

According to an aspect of the present invention, a blade of a wind turbine is provided having an improved spar cap. The spar cap includes at least one trench extending in a substantially span-wise direction in at least a portion of the spar cap. At least one shear web is connected to the spar cap. At least a portion of the shear web is positioned within the trench of the spar cap.

According to another aspect of the present invention, a blade of a wind turbine is provided having an improved spar cap. The spar cap includes at least one trench extending in a substantially span-wise direction in at least a portion of the spar cap.

According to yet another aspect of the present invention, a blade of a wind turbine is provided. The blade includes at least one spar cap having at least one trench. The trench extends in a substantially span-wise direction in at least a portion of the spar cap. The spar cap has a first surface that extends from the trench towards a side of the spar cap. At least one shear web is connected to the spar cap. Skin foam is disposed next to the spar cap and has a predetermined height. At least a portion of the shear web is positioned within the trench and at least a portion of the first surface is tapered or contoured towards the skin foam so that at least a portion of the first surface is at substantially the same height as the skin foam.

BRIEF DESCRIPTION OF THE DRAWINGS

Various aspects of this technology will now be described with reference to the following figures ("FIGS."), which are not necessarily drawn to scale, but use the same reference numerals to designate corresponding parts throughout each of the several views.

DETAILED DESCRIPTION OF THE INVENTION

Figure 4:
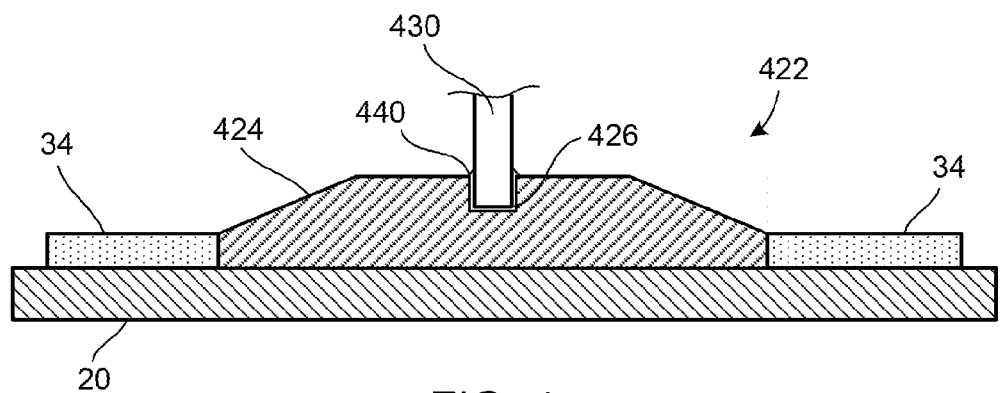
FIG. 4 is a partial, cross-sectional illustration of a spar cap and a shear web, according to aspects of the present invention.

FIG. 4 is a partial, cross-sectional illustration of an improved spar cap according to aspects of the present invention. The spar cap 422 has a contoured or tapered upper surface 424 and a trench 426. The trench 426 can extend fully or partially along the length (i.e., span-wise direction) of the spar cap. The spar cap 422 includes a first (or top) surface 424 that extends from the trench 426 to sidewalls. The sidewalls, which contact skin foam 34, extend between the first (or top) surface 424 and a second (or bottom) surface (i.e., the portion of spar cap 422 in contact with shell 20). As can be seen, the first surface 424 (or top surface) is generally opposed to the second surface (or bottom surface). The shear web 430 fits into the trench 426 and is secured by adhesive 440. The adhesive 440 is placed between the trench and at least a portion of the spar cap. For example, the shear web 430 may include a low-density material such as foam or balsa wood. The outer shell of the shear web 430 may be formed from one or more layers of resin impregnated fiber reinforcements, such as glass, carbon, aramid (e.g., Kevlar®, a registered trademark of E.I. du Pont de Nemours and Company), and/or any combination thereof. For example, the outer shell of the shear web 430 may be formed from 45 degree biaxial structural fabric. However other materials and configurations may also be used. The spar cap 422 may be joined to the inside of shell 20 or it may form part of the shell. The sides of the spar cap can be sized to substantially match the dimension or thickness of the skin foam 34.

Figure 1:
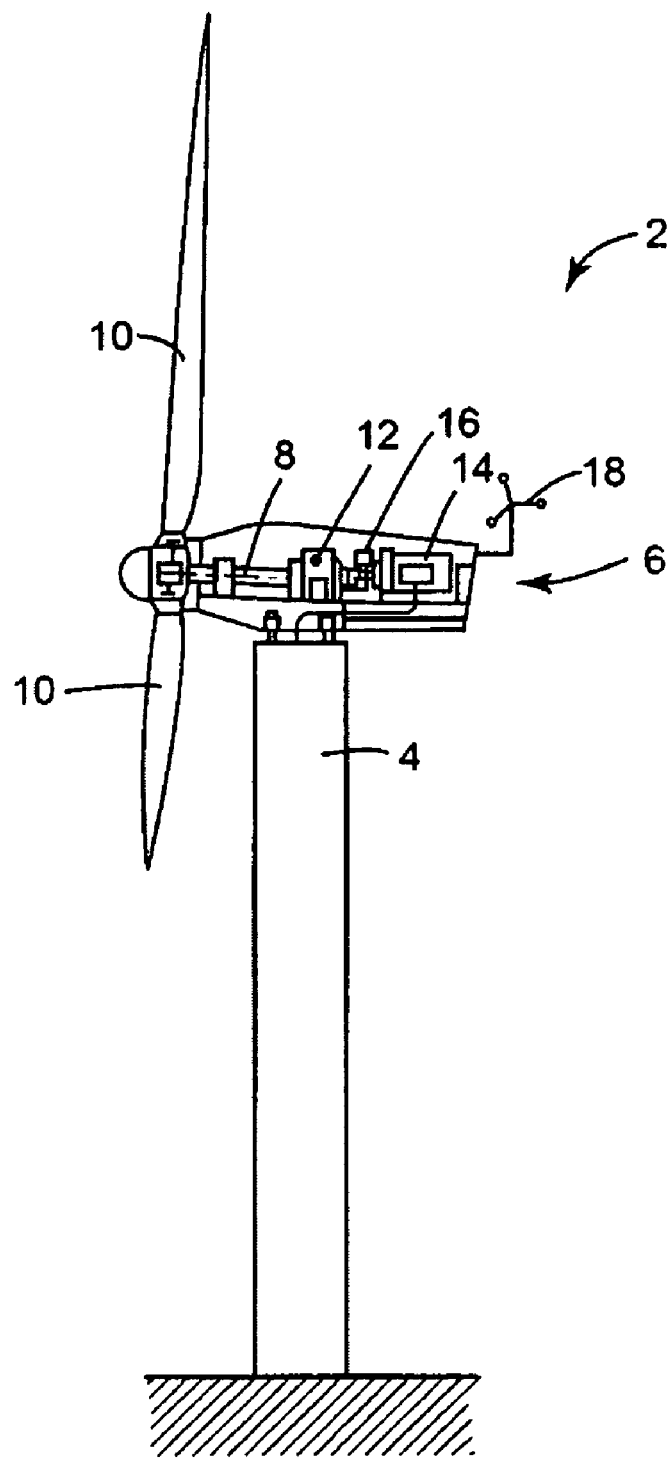
FIG. 1 is a schematic side illustration of a conventional wind turbine.
Figure 2:
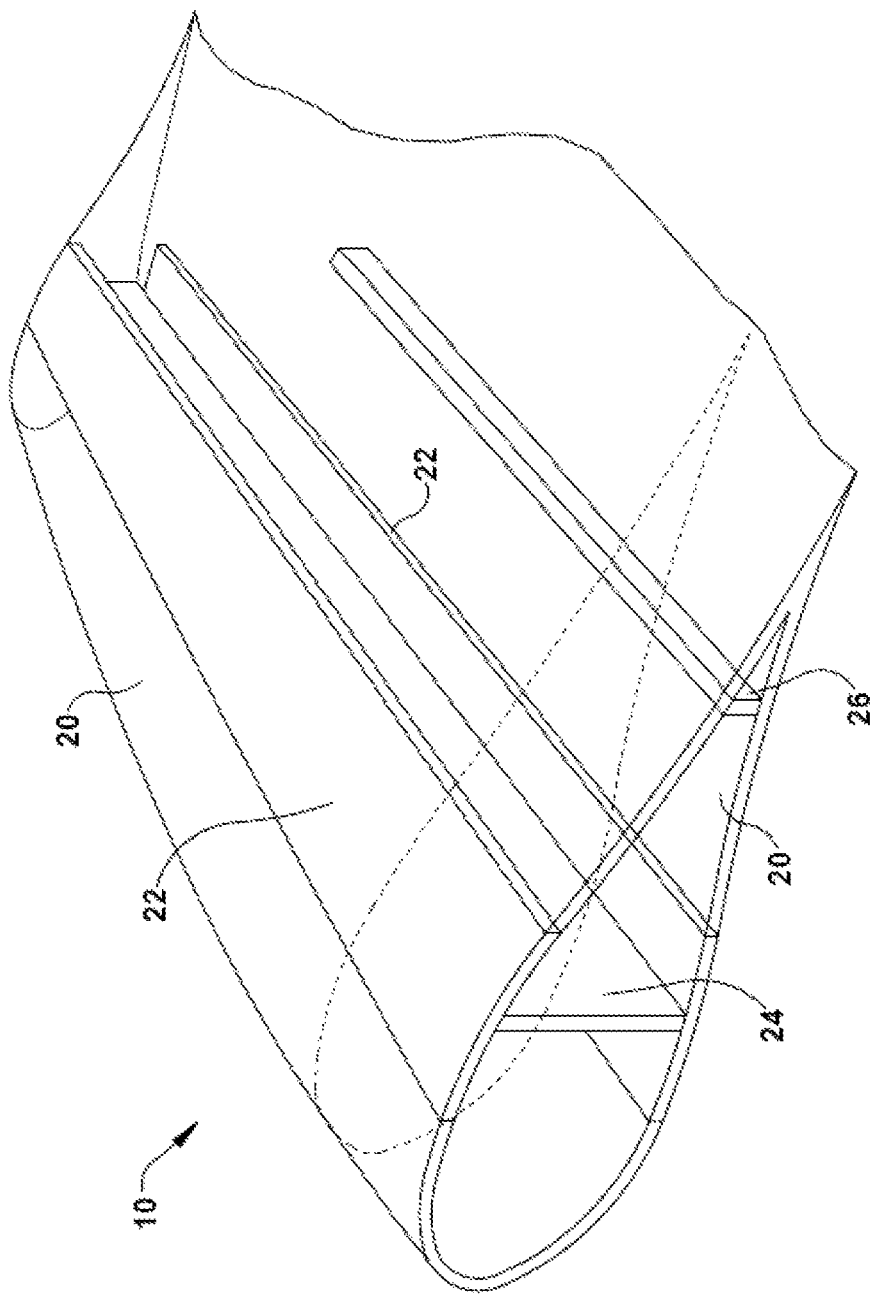
FIG. 2 is a partial, perspective illustration of the conventional wind turbine blade in FIG. 1.
Figure 3:
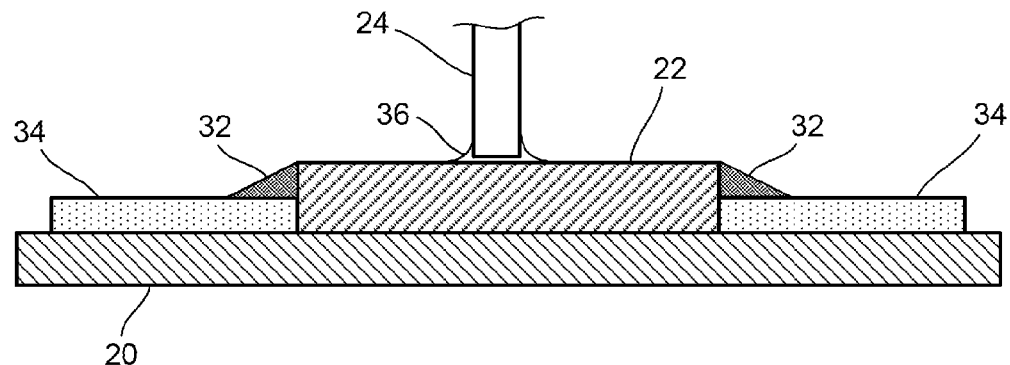
FIG. 3 is a partial, cross-sectional illustration of a spar cap and a shear web of the conventional wind turbine blade in FIG. 1.

The spar cap 422 can incorporate tapered surfaces in areas where the mating skin foam 34 is thinner. This tapered surface 424 eliminates the use of foam wedges 32 (see FIG. 3) and greatly reduces the labor required during the manufacture of blades 10. The tapered surface 424 can begin at the skin foam edge and extend partially or all the way to trench 426.

Figure 5:
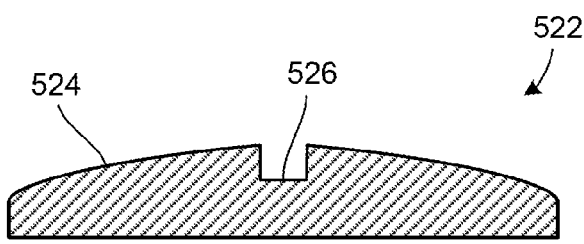
FIG. 5 is a partial, cross-sectional illustration of a spar cap, according to aspects of the present invention.

FIG. 5 illustrates a cross-sectional illustration of a spar cap 522 having a contoured or tapered surface 524, according to aspects of the present invention. In this embodiment, the spar cap 522 thickness is gradually reduced from the thickest (middle) section to the thinnest edge near the skin foam (not shown) following a curved contour. The trench 526 can be positioned near the middle of the spar cap and sized to accept a shear web 430. The spar cap 522 includes a first (or top) surface 524 that extends from the trench 526 to sidewalls. The sidewalls, which contact skin foam 34, extend between the first (or top) surface 524 and a second (for bottom) surface (i.e., the portion of spar cap 522 in contact with shell 20). As can be seen, the first surface 524 (or top surface) is generally opposed to the second surface (or bottom surface). In addition to the shape as illustrated, any suitable curved or compound curved profile could be used. However, other curvature configurations may also be used, including, but not limited to any portion or combination of various types algebraic curves, caustic curves, cissoids, conchoids, conic sections, elliptic curves, hyperbolic curves, general plane curves, implicit curves, inverse curves, involutes and evolutes, pedal curves, polar curves, pursuit curves, radial curves, roulettes, strophoids, rational, transcendental, fractal, continuous, discontinuous, and/or piecewise curves. Other curvatures may also be used including semicircular, hyperbolic. The tapered or contoured surfaces may be blended into rectangular sections where the spar cap is thinner (e.g., towards the root or the tip section of the blade).

Figure 6:
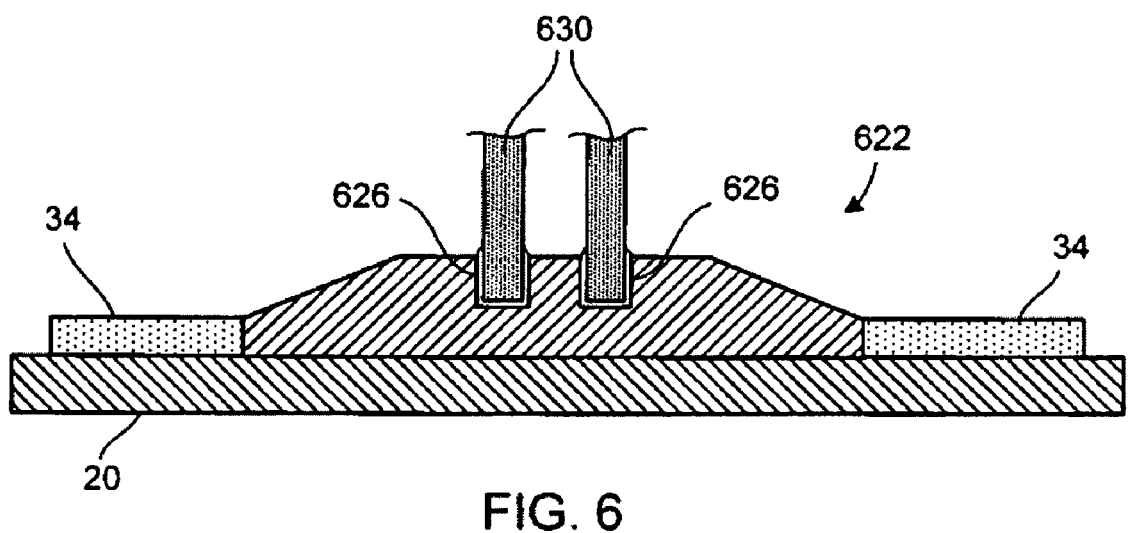
FIG. 6 is a partial, cross-sectional illustration of a spar cap and a shear web, according to aspects of the present invention.

FIG. 6 is a partial, cross-sectional illustration of an improved spar cap according to another aspect of the present invention. The spar cap 622 includes two trenches 626 which accept two shear webs 630. The first shear web and the second shear web are arranged in substantially parallel planes. It is to be understood that the spar cap 622 could include more than two trenches 626 and more than two shear webs 630 if desired. The use of multiple shear webs can provide the advantages of a stiffer spar beam having increased resistance to torsional loads on the blade 10.

The technology disclosed here offers various advantages over conventional approaches. One advantage of the present invention is that the spar cap may be made with fewer strands of unidirectional composite tape in the tapered region than used in the broader base or central region. This reduces material cost as less unidirectional composite tape and molding resin is required. Additional cost savings can be obtained by the elimination of blending foam wedges 32, reduced labor for installation, and elimination of resin needed to bond these components, in areas where the spar cap is thicker than the skin foam 34. A further advantage is the increased structural robustness of the shear web/spar cap joint provided by the increased surface area for bonding due to the incorporation of a trench. This ability to achieve increased bonding area, while still being able to optimize/reduce the shear web thickness helps meet Germanischer Lloyd (GL) certification requirements for minimum bonding area. Germanischer Lloyd is a leading certification body in the wind-energy sector, offering project and type certifications, also in other fields of renewable-energy, for manufacturers of wind turbines and components.

It should be emphasized that the embodiments described above, and particularly any "preferred" embodiments, are merely examples of various implementations that have been set forth here to provide a clear understanding of various aspects of this technology. One of ordinary skill will be able to alter many of these embodiments without substantially departing from scope of protection defined solely by the proper construction of the following claims.

What is claimed is:

1. A blade of a wind turbine, comprising:
    at least one spar cap having at least one trench, said at least one trench extending in a substantially span-wise direction in at least a portion of said at least one spar cap, the at least one spar cap comprising a first surface that extends from the at least one trench towards a side of the at least one spar cap;
    at least one shear web connecting to said at least one spar cap;
    skin foam disposed next to the at least one spar cap;
    wherein, at least a portion of said at least one shear web is positioned within said at least one trench, and at least a portion of the first surface is tapered or contoured towards the skin foam so that a portion of the first surface is at substantially the same height as the skin foam.

2. The blade recited in claim 1, wherein adhesive is placed between said at least one trench and said at least one spar cap, said adhesive for bonding said at least one spar cap to said at least one shear web.

3. The blade recited in claim 1, further comprising:
    a first spar cap having one or more trenches;
    a second spar cap opposing said first spar cap, said second spar cap having one or more trenches; and
    the at least one shear webs extending from a trench of said first spar cap to an opposing trench of said second spar cap.

4. The blade recited in claim 3, wherein:

said first spar cap comprising a first trench and a second trench;

said second spar cap comprising a third trench and a fourth trench;

wherein a first shear web extends between the first trench of said first spar cap and the third trench of said second spar cap, and a second shear web extends between the second trench of said first spar cap and the fourth trench of said second spar cap.

5. The blade recited in claim 4, wherein the first shear web and the second shear web are arranged in substantially parallel planes.

6. The blade recited in claim 1, wherein said at least one spar cap further comprises:

a second surface, substantially opposed to said first surface;

sidewalls extending from said first surface to said second surface;

wherein, at least a portion of said first surface is tapered towards said second surface.

7. The blade as recited in claim 1, wherein said at least one spar cap is comprised of unidirectional composite tape.

8. The blade as recited in claim 1, wherein said at least one shear web is comprised of:

a core, said core comprised of foam or balsa wood; and an outer shell comprised of at least one, or combinations of glass fibers, aramid fibers and carbon fibers.

9. A blade of a wind turbine, comprising:

at least one spar cap having at least one trench, said at least one trench extending in a substantially span-wise direction in at least a portion of said at least one spar cap, said at least one spar cap comprising a first surface that extends from said at least one trench towards a side of said at least one spar cap;

at least one shear web connected to said at least one spar cap;

skin foam disposed next to said at least one spar cap, said skin foam having a predetermined height;

wherein, at least a portion of said at least one shear web is positioned within said at least one trench and at least a portion of said first surface is tapered or contoured towards said skin foam so that at least a portion of said first surface is at substantially the same height as said skin foam.

10. The blade recited in claim 9, wherein adhesive is placed between the at least one trench and the at least one shear web, the adhesive for bonding the at least one spar cap to the at least one shear web.

11. The blade recited in claim 9, further comprising:

a first spar cap having one or more trenches;

a second spar cap opposing the first spar cap, the second spar cap having one or more trenches; and the at least one shear web extending from a trench of the first spar cap to an opposing trench of the second spar cap.

12. The blade recited in claim 11, wherein:

the first spar cap comprises a first trench and a second trench;

the second spar cap comprises a third trench and a fourth trench;

wherein a first shear web extends between the first trench of the first spar cap and the third trench of the second spar cap, and a second shear web extends between the second trench of the first spar cap and the fourth trench of the second spar cap.

13. The blade recited in claim 12, wherein the first shear web and the second shear web are arranged in substantially parallel planes.

14. The blade recited in claim 9, wherein the at least one spar cap further comprises:

a second surface, substantially opposed to the first surface;

sidewalls extending from the first surface to the second surface;

wherein, at least a portion of the first surface is tapered towards the second surface.

15. The blade recited in claim 9, wherein the first surface of the at least one spar cap is a top surface, the at least one spar cap further comprising:

a bottom surface, substantially opposed to the top surface;

sidewalls extending from the top surface to the bottom surface;

wherein, at least a portion of the top surface is tapered towards the bottom surface.

16. The blade recited in claim 9, wherein the at least one spar cap further comprises:

a second surface, substantially opposed to the first surface;

sidewalls extending from the first surface to the second surface;

wherein, at least a portion of the first surface is contoured to slope towards the second surface.

17. The blade recited in claim 9, wherein the first surface of the at least one spar cap is a top surface, the at least one spar cap further comprising:

a bottom surface, substantially opposed to the top surface;

sidewalls extending from the top surface to the bottom surface;

wherein, at least a portion of the top surface is contoured to slope towards the bottom surface.

18. The blade as recited in claim 9, wherein the at least one spar cap is comprised of unidirectional composite tape.

19. The blade as recited in claim 9, wherein the at least one shear web is comprised of:

a core comprised of foam or balsa wood; and an outer shell comprised of at least one, or combinations of glass fibers, aramid fibers and carbon fibers.

* * * * *